(12) United States Patent
Sun et al.

(10) Patent No.: US 11,810,004 B2
(45) Date of Patent: Nov. 7, 2023

(54) OPTIMIZING USER EXPERIENCES USING A FEEDBACK LOOP

(71) Applicant: Capital One Services, LLC, McLean, VA (US)

(72) Inventors: Weiyan Sun, Carrollton, TX (US); Rohit Sarin, Dallas, TX (US); Elizabeth Claire Maue, Dallas, TX (US); Dustin Douglas, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 337 days.

(21) Appl. No.: 16/903,836

(22) Filed: Jun. 17, 2020

(65) Prior Publication Data

US 2021/0397984 A1 Dec. 23, 2021

(51) Int. Cl.
*G06N 5/04* (2023.01)
*G06Q 30/0201* (2023.01)

(52) U.S. Cl.
CPC ........... *G06N 5/04* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 8,478,621 B1 | 7/2013 | Plummer et al. | |
| 10,185,972 B2 | 1/2019 | Churchill et al. | |
| 10,334,398 B2 | 6/2019 | DeLuca et al. | |
| 10,338,913 B2 | 7/2019 | Franchitti | |
| 2011/0295731 A1 | 12/2011 | Waldron, III et al. | |
| 2014/0249873 A1 | 9/2014 | Stephan et al. | |
| 2015/0127595 A1 | 5/2015 | Hawkins, II et al. | |
| 2015/0296026 A1 | 10/2015 | Smyth et al. | |
| 2016/0210656 A1 | 7/2016 | Chittilappilly et al. | |
| 2016/0210657 A1 | 7/2016 | Chittilappilly et al. | |
| 2016/0210661 A1 | 7/2016 | Chittilappilly et al. | |
| 2017/0323330 A1 | 11/2017 | Chittilappilly et al. | |
| 2017/0337588 A1 | 11/2017 | Chittilappilly et al. | |
| 2018/0240152 A1 | 8/2018 | Mookherjee et al. | |
| 2018/0247227 A1 | 8/2018 | Holtham | |
| 2018/0315103 A1 | 11/2018 | Lakshminarayan et al. | |
| 2019/0034963 A1 | 1/2019 | George et al. | |
| 2019/0043115 A1 | 2/2019 | Purves et al. | |
| 2019/0095502 A1 | 3/2019 | Beringer et al. | |
| 2019/0180358 A1 | 6/2019 | Nandan et al. | |
| 2020/0202272 A1 | 6/2020 | Aravamudhan et al. | |
| 2020/0327444 A1 | 10/2020 | Negi et al. | |
| 2021/0073327 A1 | 3/2021 | Brunn et al. | |
| 2021/0174403 A1 | 6/2021 | Bellini et al. | |

*Primary Examiner* — Brian Whipple
(74) *Attorney, Agent, or Firm* — Sterne, Kessler, Goldstein & Fox P.L.L.C.

(57) ABSTRACT

The present disclosure is directed to systems and methods for predicting an outcome of a user journey. For example, a method may include: identifying a plurality of patterns based on a plurality of user interactions of a plurality of users with a plurality of touchpoints; applying a parameter to filter the plurality of patterns; evaluating the filtered plurality of patterns based an evaluation criterion; and applying a feedback loop based on the evaluation of the filtered patterns to modify the parameter or adjust a user experience.

20 Claims, 3 Drawing Sheets

OPTIMIZING USER EXPERIENCES USING A FEEDBACK LOOP

BACKGROUND

Touchpoints are a building block of user experiences with a company or brand. For example, touchpoints may be any interaction between a customer and a product, brand, business, or service. In some instances, touchpoints may be direct interactions with the product, brand, business, or service, or they may be an indirect interaction (e.g., an online review.) It is important for user experience (UX) designers to better understand users' interactions with these touchpoints to enhance each user experience.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for predicting an outcome of a user journey.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Figure 1:
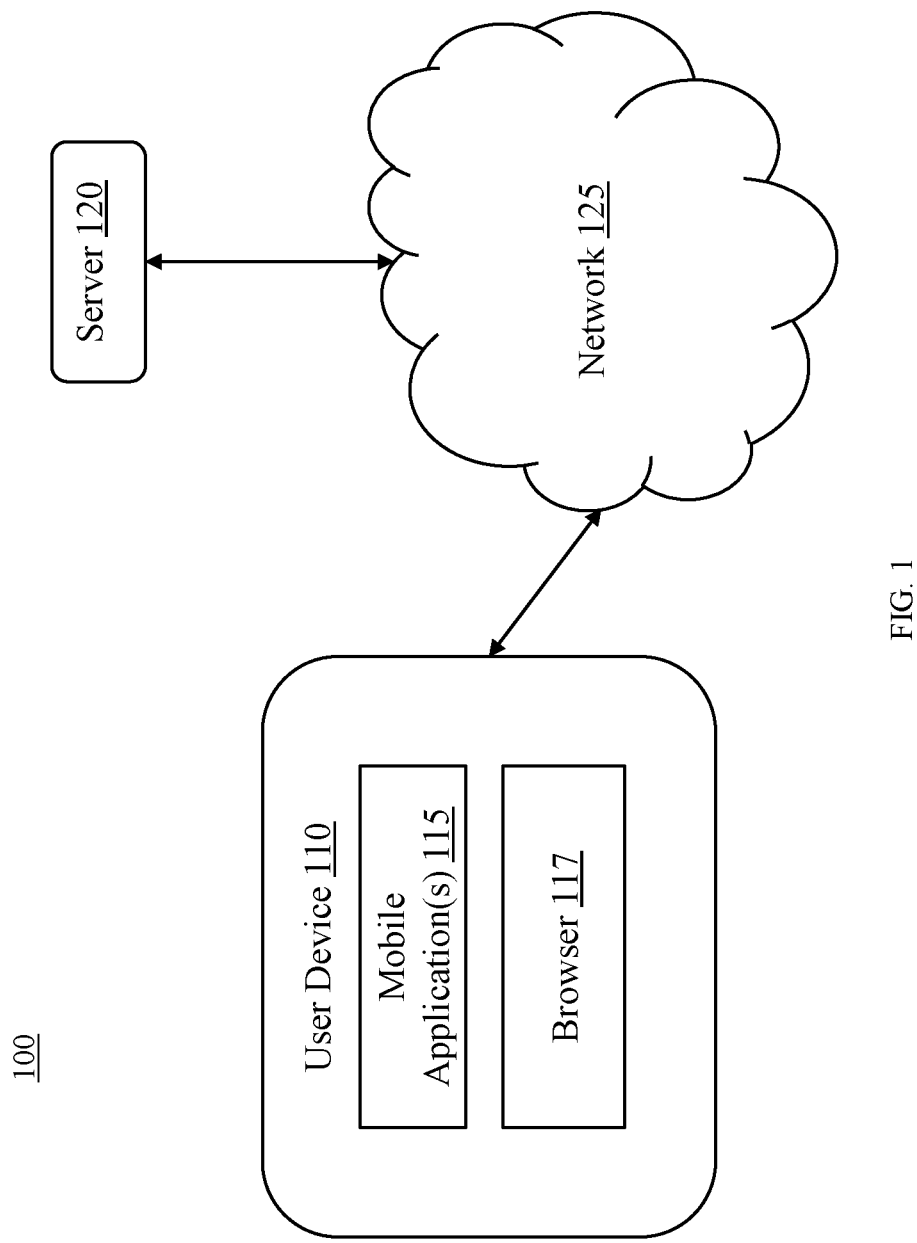
FIG. 1 is a block diagram of a system, according to some embodiments.

FIG. 1 is a diagram of an example environment 100 in which systems and/or methods, described herein, may be implemented. As shown in FIG. 1, environment 100 may include a client device 110, a server 120, a network 125. Devices of the environment 100 may interconnect via wired connections, wireless connections, or a combination of wired and wireless connections. Devices of environment 100 may include a computer system 300 shown in FIG. 3, discussed in greater detail below.

In some embodiments, the client device 110 may be any device that may be used to access an account associated with an operator of the server 120. For example, the client 110 may be a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. The client device 110 may include one or more mobile applications 115 and/or a browser 117. For example, the one or more mobile applications 115 may include a mobile application associated with an operator of the server 120. In some embodiments, a user may interact with a plurality of touchpoints via the mobile application 115. In further embodiments, the user may interact with the plurality of touchpoints via a website using the browser 117.

The server 120 may include a server device (e.g., a host server, a web server, an application server, etc.), a data center device, or a similar device, capable of communicating with the client device 110 via the network 125. In some embodiments, the server 120 may obtain interaction data or response data from the client device 110. For example, the interaction data may concern one or more user interactions (e.g., one or more interactions between a user and the mobile application 115 or browser 117). That is, the interaction data may be related to a website interaction, a mobile application interaction, a transaction card terminal interaction, a payment interaction, a withdrawal interaction, a deposit interaction, a returned payment interaction, a bill payment interaction, a customer service interaction, a virtual assistant interaction (e.g., via a chatbot or an interactive voice response (IVR) device), a point of sale interaction, a financial product interaction, a financial product application interaction, a financial account interaction, and/or the like.

In some embodiments, the interaction data may comprise one or more touchpoints (e.g., one or more pieces of information) concerning the interaction(s). For example, a touchpoint may include information regarding a time that the interaction occurred; information regarding a specific type of interaction; information concerning who initiated the user interaction (e.g., the user, a representative of an organization, a virtual assistant, and/or the like); information concerning how the user interaction was initiated (e.g., via a website, a mobile application, a transaction card terminal, and/or the like); information concerning why the user interaction was initiated (e.g., the user wanted to pay a bill that is past due, the user wanted to transfer money between financial accounts, and/or the like); information concerning what was conveyed during the user interaction (e.g., identification information concerning the user; information concerning a user account, a financial account, a financial product, a financial product application, a bill; and/or the like); information concerning how long the user interaction lasted (e.g., an amount of time between initiation of the user interaction and termination of the user interaction); information concerning a wait time associated with the user interaction (e.g., an amount of time between initiation of the user interaction and when a representative of an organization and/or virtual assistant communicated with the user); information concerning whether the user interaction is associated with an existing user interaction issue (e.g., whether the user initiated a customer service interaction to discuss a reoccurring issue with a bill, a financial account, and/or the like); information concerning whether the user indicated dissatisfaction with the user interaction (e.g., whether the user requested to talk to a customer service representative, whether the user indicated that the user needed help during the user interaction, and/or the like); information concerning whether a corrective action was taken to address the user's dissatisfaction with the user interaction (e.g., whether a virtual assistant call was routed to a customer service representative, whether a customer service representative called the user after the user interaction, whether the user was offered a monetary credit, a discount, and/or the like); and/or the like. That is, the interaction data may include information related to a plurality of user journeys of multiple users through the plurality of touchpoints, e.g., end-to-end user experiences with the plurality of touchpoints. As such, each user journey may indicate each touchpoint that the user interacted with.

The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
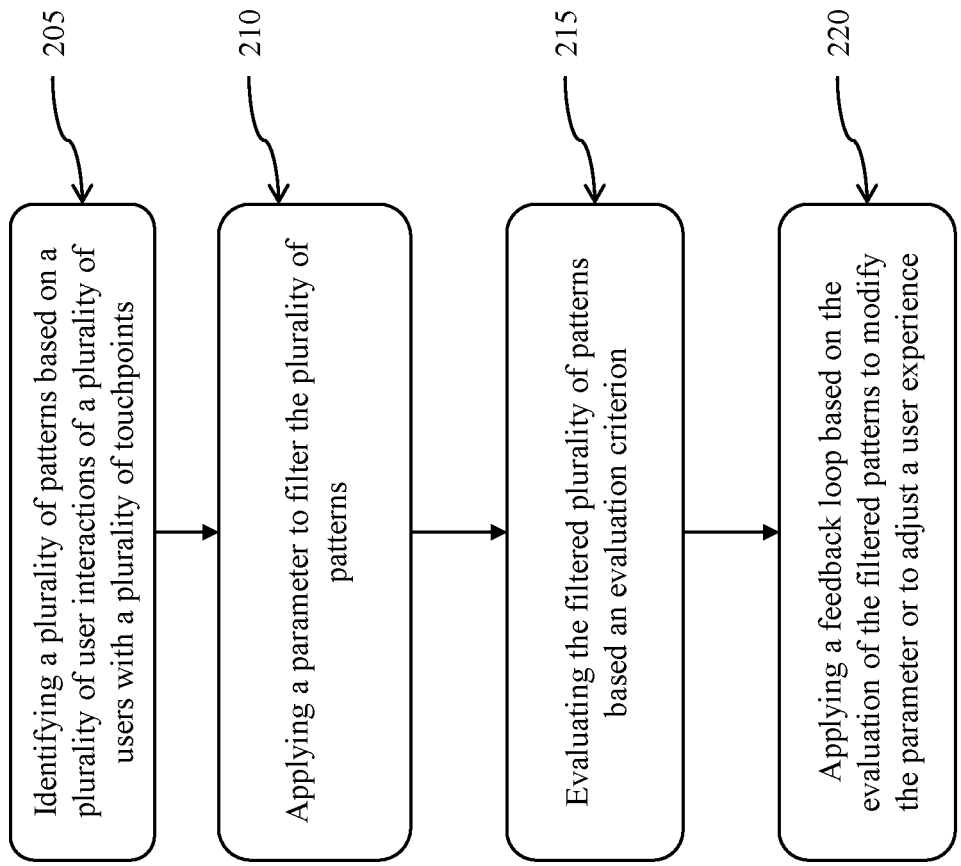
FIG. 2 is a flowchart illustrating a process for applying a feedback loop to modify a parameter for analyzing a plurality of patterns or to adjust a user experience, according to some embodiments.

FIG. 2 is a flow chart of an example method 200 for applying a feedback loop to modify a parameter for analyzing a plurality of patterns or to adjust a user experience. In some embodiments, one or more processes described with respect to FIG. 2 may be performed by a server device (e.g., the server 120 of FIG. 1). At 205, the method may include identifying, by the server 120, a plurality of patterns based on a plurality of user interactions of a plurality of users with a plurality of touchpoints. To achieve this, the server 120 may process the interaction data using a modelling pipeline. In some embodiments, the modelling pipeline may be based on a combination of one or more techniques, such as a pattern mining technique, a recursive feature elimination technique, a gradient boosting technique, and/or the like. The pattern mining technique may be, for example, a sequential pattern mining technique (e.g. a sequential pattern discovery using equivalence classes (SPADE) technique, a frequent closed sequential pattern mining technique, a vertical mining of maximal sequential patterns (VMSP) technique, and/or the like). In further embodiments, the modeling pipeline may be based on one or more data mining techniques, such as tracking patterns, classification, association, or clustering.

At 210, the method may further include applying, by the server 120, a parameter to filter the plurality of patterns. The parameter may be, for example, a minimum support requirement, e.g., a minimum number of occurrences of an identified pattern, a period of time for filtering the plurality of patterns, or a combination of both. The minimum number of occurrences of an identified pattern may be applied to ensure that spurious and/or random patterns are removed from the plurality of patterns. For example, if one million patterns are identified, the server 120 may apply the minimum number of occurrences to the identified patterns to remove any patterns that did not occur at least, for example, five hundred (500) times. It should be understood by those of ordinary skill in the arts that this is merely an example of a minimum number of occurrences, and that any minimum number may applied in accordance with aspects of the present disclosure. Additionally, the period of time may be any period of time, such as a week, a month, a quarter, etc., that may be applied to focus on a particular window of time. In this way, the server 120 may evaluate the plurality of patterns over a defined period of time.

At 215, the method may include evaluating, by the server 120, the filtered plurality of patterns based an evaluation criterion. In some embodiments, the evaluation criterion may include a pattern coverage threshold value, e.g., a minimum number of users experiencing the identified patterns. That is, for each of the filtered patterns, the server 120 may determine whether a minimum number of users from among the plurality of users are represented in the given pattern. For example, for each of the filtered patterns, the server 120 may determine whether a minimum number of users, e.g., five hundred users, experienced the given pattern. In another example, the evaluating may include determining whether the minimum number of users is satisfied based on the pattern coverage threshold value.

In some embodiments, the evaluation criterion may include a performance score to determine an accuracy of the plurality of patterns. The performance score may be, for example, based on a gradient boosting engine configured to analyze the plurality of patterns. In some embodiments, the gradient boosting engine may use the plurality of patterns as time series data to generate predicted user sentiments. For example, gradient boosting may be used to approach a binary classification problem (e.g., whether or not a user is satisfied). Based on the predicted user sentiments, the server 120 may determine a goodness of fit of a pattern coverage of the filtered plurality of patterns. For example, in some embodiments, the server 120 may compare the filtered plurality of patterns with the predicted user sentiments to measure of a goodness of fit of the pattern coverage. Using the goodness of fits, the server 120 may calculate an area under a receiver operating characteristic curve, which may be illustrated as a score on a scale from 0 to 1. As such, the performance score may be rated on a scale from 0 to 1.

In some embodiments, the evaluation criterion may include a validation check of the user experience to determine whether each touchpoint of the user experience is represented in a pattern of the user. For example, the user experience may include accessing a web site (e.g., a website for applying for a credit card) using the browser 117 and then closing the browser 117, such that the pattern does not include any further information (e.g., whether or not the user was approved for the credit card or whether the user applied for the credit card). In this situation, the server 120 may determine that this particular pattern is incomplete and not representative of the full user experience.

At 220, the method may include applying, by the server 120, a feedback loop based on the evaluation of the filtered patterns to modify the parameter or to adjust a user experience, e.g., adding one or more touchpoints. For example, modifying the parameter may include iteratively reducing the minimum number of occurrences or iteratively increasing the period of time. In some embodiments, when the evaluation indicates that the minimum number of users fails to satisfy the pattern coverage threshold value, the server 120 may iteratively modify the parameter until the minimum number of users satisfies the pattern coverage threshold value. For example, the server 120 may iteratively reduce the minimum number of occurrences and/or iteratively increase the period of time until the minimum number of users satisfies the pattern coverage threshold value. In some embodiments, when the evaluation indicates that the minimum number of users fails to satisfy the pattern coverage threshold value, the server 120 may also adjust the plurality of touchpoints by adding a touchpoint to the touchpoints of the user experience. In this way, the server 120 may more granularly define the patterns, such that a given pattern may be more readily identified in the plurality of patterns.

In some embodiments, when the evaluation indicates that the performance score is below a threshold performance score, e.g., 0.9 on the scale from 0 to 1, the server 120 may iteratively modify the parameter until the performance score satisfies a minimum threshold. For example, the server 120 may iteratively reduce the minimum number of occurrences and/or iteratively increase the period of time until the performance score satisfies a minimum threshold. It should be understood by those of ordinary skill in the art that this is merely an example threshold performance score, and that other threshold performance scores are further contemplated in accordance with aspects of the present disclosure. In some embodiments when the evaluation indicates that the performance score is below the threshold performance score, the server 120 may also adjust the plurality of touchpoints by adding a touchpoint to the touchpoints of the user experience. In this way, the server 120 may more granularly define the patterns, such the comparison of the filtered plurality of patterns and the predicted user sentiments is more accurate.

In some embodiments, when the evaluation indicates that the particular pattern is incomplete, the server 120 may iteratively modify the parameter until the validation check indicates that the particular pattern is complete. For example, the server 120 may iteratively reduce the minimum number of occurrences and/or iteratively increase the period of time until the particular pattern is complete. In some embodiments, the adjusting the plurality of touchpoints may include adding a touchpoint to the touchpoints of the user experience. For example, when the pattern is incomplete and not representative of the full user experience, the server 120 may add another touchpoint. Using the example above, when the pattern does not include whether or not the user was approved for the credit card or whether the user applied for the credit card, the server 120 may add a touchpoint to the pattern indicating such result. In this way, the pattern associated with the user experience is wholly reflective of the end-to-end experience of the user.

Figure 3:
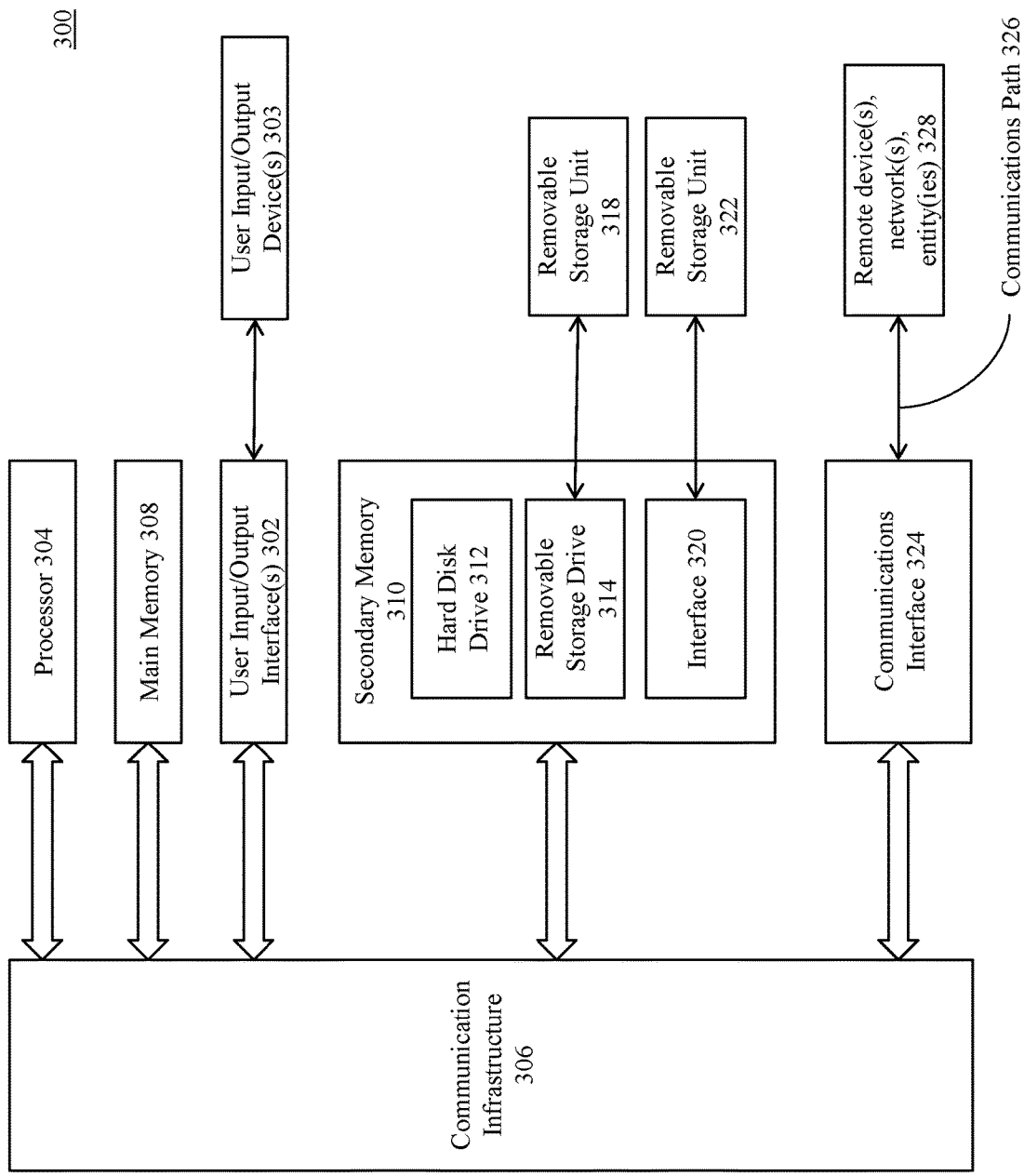
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system embodiments other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
    obtaining, by a server from a client device, interaction data comprising one or more touchpoints concerning one or more user interactions between a user and a website operating on the client device to access an account associated with an operator of the server, wherein a touchpoint includes information about what is conveyed during the one or more user interactions between the user and the website;
    identifying, by the server, a plurality of patterns based on the interaction data concerning a plurality of user interactions of a plurality of users with a plurality of touchpoints including the one or more user interactions of the user with the one or more touchpoints;
    applying a parameter to filter the plurality of patterns;
    evaluating the filtered plurality of patterns based on an evaluation criterion; and
    applying a feedback loop based on the evaluation of the filtered plurality of patterns to modify the parameter or adjust a user experience including a sequence of touchpoints associated with the user.

2. The method of claim 1, wherein the parameter comprises a minimum number of occurrences of an identified pattern or a period of time for filtering the plurality of patterns.

3. The method of claim 2, wherein the evaluation criterion comprises a pattern coverage threshold value to determine whether a minimum number of users from among the plurality of users are represented in the filtered plurality of patterns, and the evaluating comprises determining whether the minimum number of users is satisfied based on the pattern coverage threshold value.

4. The method of claim 3, wherein, in response to determining that the minimum number of users fails to satisfy the pattern coverage threshold value, the modifying the parameter comprises iteratively modifying the parameter until the minimum number of users satisfies the pattern coverage threshold value.

5. The method of claim 1, wherein the evaluation criterion comprises a performance score to determine an accuracy of the plurality of patterns, and the evaluating comprises determining whether the performance score is above a threshold performance score, and wherein, in response to determining that the performance score is below the threshold performance score, the modifying the parameter comprises iteratively modifying the parameter until the performance score satisfies the threshold performance score.

6. The method of claim 1, wherein the evaluation criterion comprises a validation check of the user experience to determine whether each touchpoint of the user experience is represented in a pattern of the user.

7. The method of claim 6, wherein the adjusting the plurality of touchpoints comprises adding a touchpoint to the plurality of touchpoints of the user experience.

8. A system, comprising:
    a memory for storing instructions for optimizing a user journey; and a processor, communicatively coupled to the memory, configured to execute the instructions, the instructions causing the processor to:
   obtain, from a client device, interaction data comprising one or more touchpoints concerning one or more user interactions between a user and a website operating on the client device to access an account associated with an operator of the system, wherein a touchpoint includes information about what is conveyed during the one or more user interactions between the user and the website;
   identify a plurality of patterns based on the interaction data concerning a plurality of user interactions of a plurality of users with a plurality of touchpoints including the one or more user interactions of the user with the one or more touchpoints;
   apply a plurality of parameters to filter the plurality of patterns;
   evaluate the filtered plurality of patterns based on a plurality of evaluation criteria; and
   apply a feedback loop based on the evaluation of the filtered plurality of patterns to modify the plurality of parameters or adjust a user experience including a sequence of touchpoints associated with the user.

9. The system of claim 8, wherein the plurality of parameters comprises a minimum number of occurrences of an identified pattern and a period of time for filtering the plurality of patterns.

10. The system of claim 9, wherein the plurality of evaluation criteria comprises:
   a pattern coverage threshold value to determine whether a minimum number of users from among the plurality of users are represented in the filtered plurality of patterns;
   a performance score to determine an accuracy of the plurality of patterns; and
   a validation check of the user experience to determine whether each touchpoint of the user experience is represented in a pattern of the user.

11. The system of claim 10, wherein the evaluating comprises determining whether the minimum number of users is satisfied based on the pattern coverage threshold value.

12. The system of claim 11, wherein, in response to determining that the minimum number of users fails to satisfy the pattern coverage threshold value, the modifying the plurality of parameters comprises iteratively modifying the plurality of parameters until the minimum number users is satisfied.

13. The system of claim 11, wherein the evaluating comprises determining whether the performance score is above a threshold performance score, and wherein, in response to determining that the performance score is below the threshold performance score, the modifying the plurality of parameters comprises iteratively modifying the plurality of parameters until the performance score satisfies the threshold performance score.

14. The system of claim 11, wherein the adjusting the plurality of touchpoints comprises adding a touchpoint to the plurality of touchpoints of the user experience.

15. A non-transitory, tangible computer-readable device having instructions stored thereon that, when executed by at least one computing device, cause the at least one computing device to perform operations comprising:
   obtaining, from a client device, interaction data comprising one or more touchpoints concerning one or more user interactions between a user and a website operating on the client device to access an account associated with an operator of the at least one computing device, wherein a touchpoint includes information about what is conveyed during the one or more user interactions between the user and the website;
   identifying a plurality of patterns based on the interaction data concerning a plurality of user interactions of a plurality of users with a plurality of touchpoints including the one or more user interactions of the user with the one or more touchpoints;
   applying a plurality of parameters to filter the plurality of patterns;
   evaluating the filtered plurality of patterns based on a plurality of evaluation criteria; and
   applying a feedback loop based on the evaluation of the filtered plurality of patterns to modify the plurality of parameters or adjust a user experience including a sequence of touchpoints associated with the user.

16. The non-transitory, tangible computer-readable device of claim 15, wherein the plurality of parameters comprises a minimum number of occurrences of an identified pattern or a period of time for filtering the plurality of patterns.

17. The non-transitory, tangible computer-readable device of claim 16, wherein the plurality of evaluation criteria comprises:
   a pattern coverage threshold value to determine whether a minimum number of users from among the plurality of users are represented in the filtered plurality of patterns;
   a performance score to determine an accuracy of the plurality of patterns; and
   a validation check of the user experience to determine whether each touchpoint of the user experience is represented in a pattern of the user.

18. The non-transitory, tangible computer-readable device of claim 17, wherein the evaluating comprises determining whether the minimum number of users is satisfied based on the pattern coverage threshold value, and wherein, in response to determining that the minimum number of users fails to satisfy the pattern coverage threshold value, the modifying the plurality of parameters comprises iteratively modifying the plurality of parameters until the minimum number users is satisfied.

19. The non-transitory, tangible computer-readable device of claim 17, wherein the evaluating comprises determining whether the performance score is above a threshold performance score, and wherein the modifying the plurality of parameters comprises iteratively modifying the plurality of parameters until the performance score is above the threshold performance score.

20. The non-transitory, tangible computer-readable device of claim 17, wherein the adjusting the plurality of touchpoints comprises adding a touchpoint to the plurality of touchpoints of the user experience.

* * * * *